United States Patent [19]

Ishimatsu et al.

[11] Patent Number: 4,736,700
[45] Date of Patent: Apr. 12, 1988

[54] SMALL WATERCRAFT WITH MOVABLE WING

[75] Inventors: Tsutomu Ishimatsu, Akashi; Hiroshi Nishida, Higashi; Masahiro Kawahara, Kobe, all of Japan

[73] Assignee: Kawasaki Jukogyo Kabushiki Kaisha, Kobe, Japan

[21] Appl. No.: 867,518

[22] Filed: May 27, 1986

[30] Foreign Application Priority Data

May 28, 1985 [JP] Japan .................................. 60-115849
Jun. 12, 1985 [JP] Japan .................................. 60-129057

[51] Int. Cl.⁴ ............................................. B63B 35/00
[52] U.S. Cl. ..................................... 114/273; 114/270
[58] Field of Search .................. 440/38; 114/270, 271, 114/272, 273; 180/181, 182, 903

[56] References Cited

U.S. PATENT DOCUMENTS

| | | | |
|---|---|---|---|
| 1,012,416 | 12/1911 | Niemczura | 114/273 |
| 3,648,640 | 3/1972 | Granger | 114/273 |
| 3,786,774 | 1/1974 | Gabel | 114/273 |
| 3,884,172 | 5/1975 | Takahashi | 114/273 |
| 3,989,002 | 11/1976 | Peterson | 114/270 |
| 4,568,293 | 2/1986 | Yazaki | 114/270 |
| 4,611,796 | 9/1986 | Orr | 180/903 |

Primary Examiner—Joseph F. Peters, Jr.
Assistant Examiner—Stephen P. Avila
Attorney, Agent, or Firm—Marshall, O'Toole, Gerstein, Murray & Bicknell

[57] ABSTRACT

This disclosure relates to a small craft comprising a hull, a control handle supported on the hull adjacent its bow for pivotal movement in a substantially vertical plane that includes the center line of the hull. The handle extends rearwardly over the hull and is adapted to be manually operated. A wing is connected to the handle so as to have an angle of attack which changes as the handle is pivoted.

5 Claims, 4 Drawing Sheets

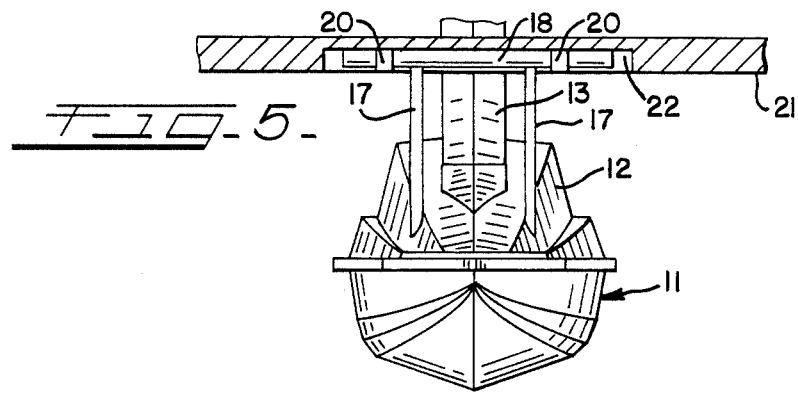
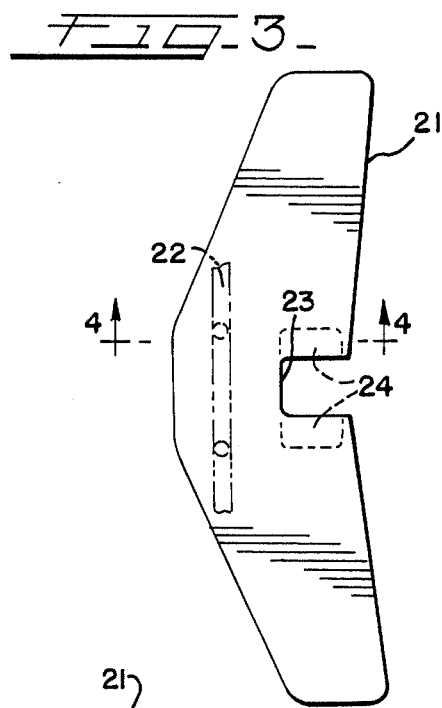
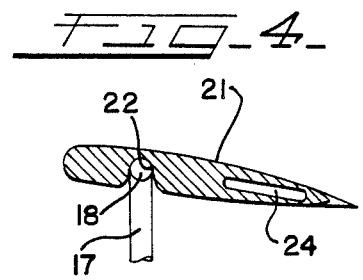
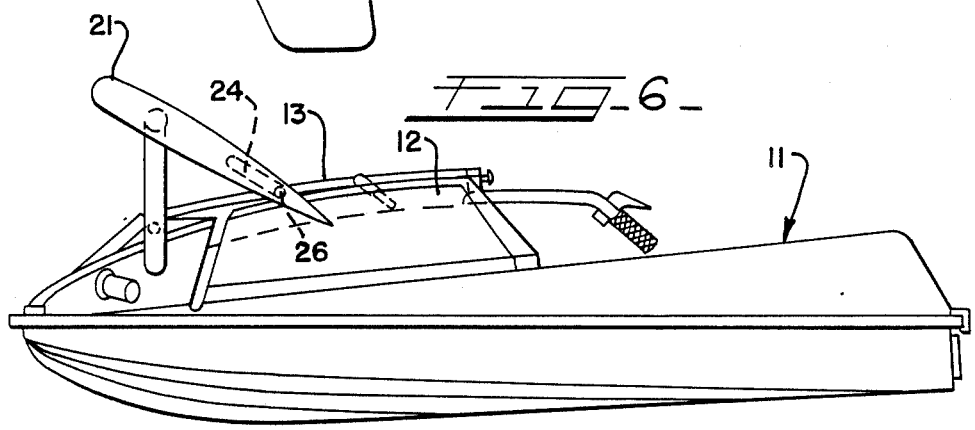

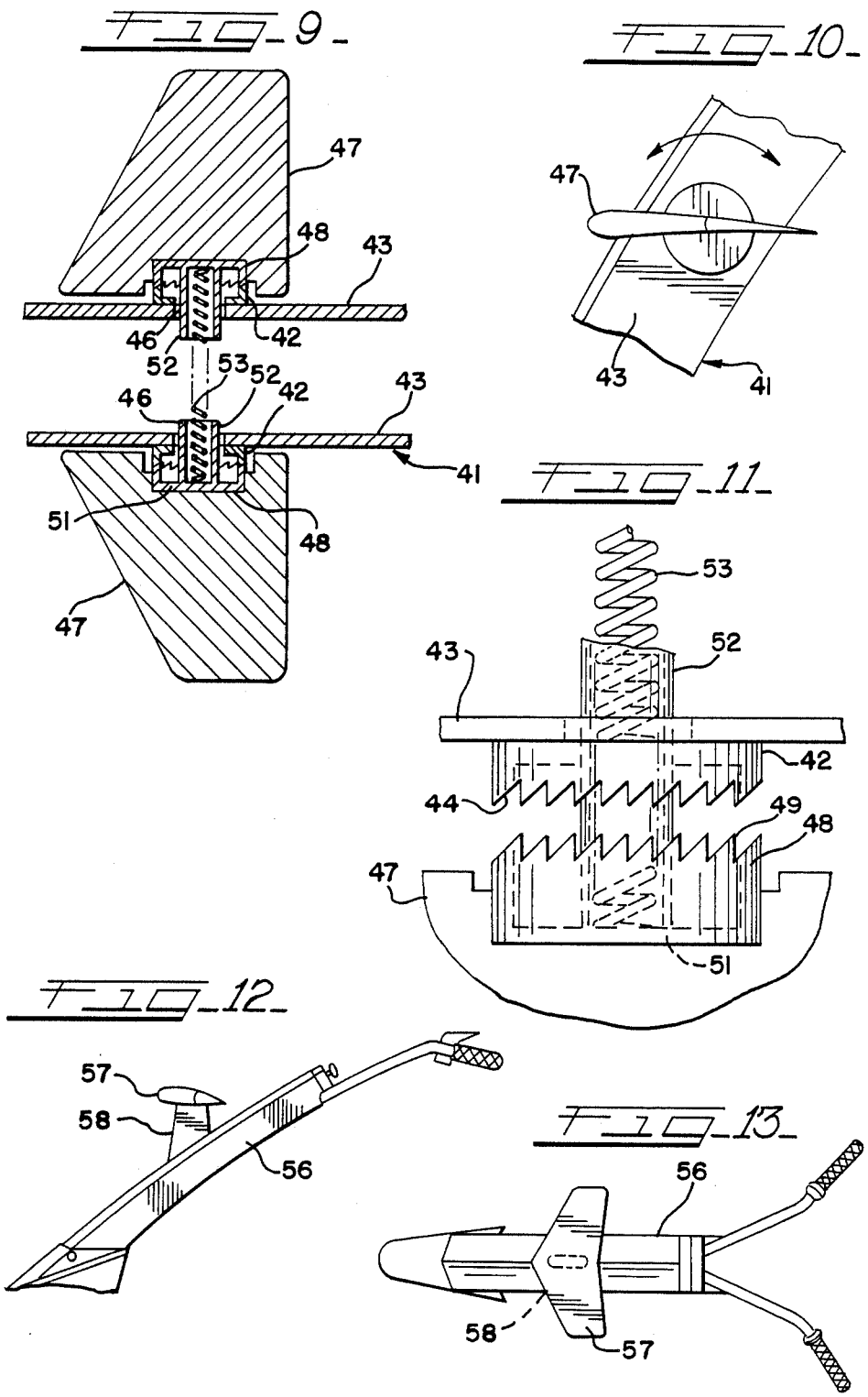

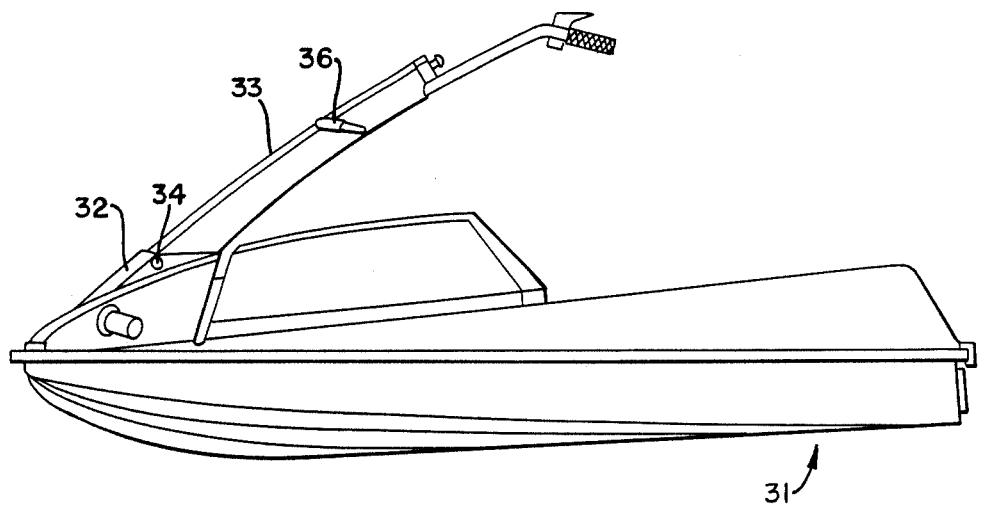
FIG-7-
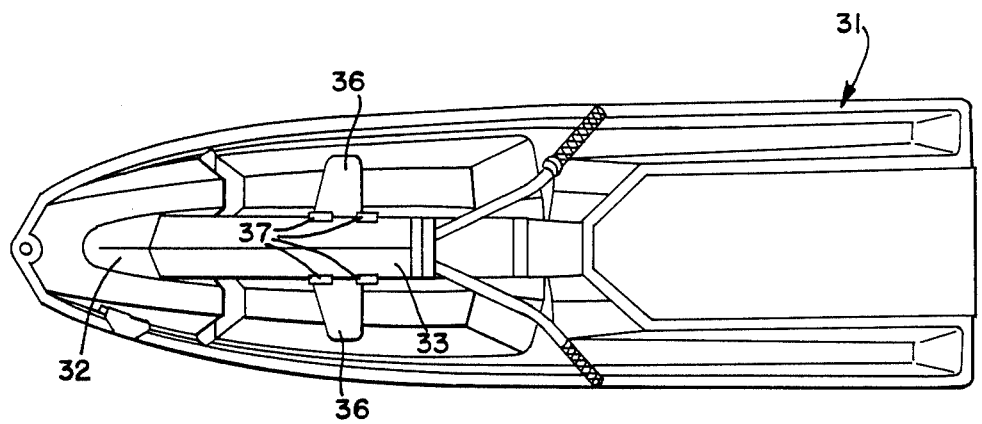
FIG-8-

SMALL WATERCRAFT WITH MOVABLE WING

FIELD AND BACKGROUND OF THE INVENTION

This invention relates to small watercraft of the type having a water jet propulsion system.

Relatively small watercraft for leisure and recreational purposes have become increasingly popular in recent years. Such crafts include a platform for an operator who holds a control pole or handle. An engine-driven propeller forms a jet of water which propels the boat, and a guide is provided for the jet in order to steer the craft.

The popularity of such crafts is in large part due to the maneuverability of the craft, and the degree of control by the operator. Consequently, any device which increases the operator's control constitutes an important feature.

It is a general object of the present invention to provide a craft of the foregoing type, which includes means for positively or manually controling the dynamic lift of the craft.

It is another object of the invention to provide such a craft having an easily operable control handle.

SUMMARY OF THE INVENTION

A small craft according to this invention comprises a hull and a control handle which is supported on the hull adjacent the bow, the handle being pivotable up or down in a substantially vertical plane that includes the center line of the hull. The handle extends rearwardly over the hull for manual operation by an operator. A wing is attached to the pole and has an angle of attack which changes as the pole is pivoted.

BRIEF DESCRIPTION OF THE DRAWINGS

This invention will be better understood from the following description of the invention, taken in conjunction with the accompanying drawings, wherein:

FIG. 3 is a top plan view of a wing of the craft;

FIG. 4 is an enlarged sectional view taken along the line 4—4 of FIG. 3;

FIG. 5 is a view taken on the line 5—5 of FIG. 1;

FIG. 6 is a view similar to FIG. 1 but showing different positions of the parts;

FIG. 7 is a side view of a craft according to a second embodiment;

FIG. 8 is a top plan view of the craft of FIG. 7;

FIG. 9 is a fragmentary view in cross section showing a third embodiment;

FIG. 10 is a side view of the construction of FIG. 9;

FIG. 11 is an enlarged fragmentary view of part of the structure of FIG. 9;

FIG. 12 is a fragmentary side view showing the fourth embodiment; and

FIG. 13 is a top plan view of the construction shown in FIG. 12.

DETAILED DESCRIPTION OF THE DRAWINGS

Figure 1:
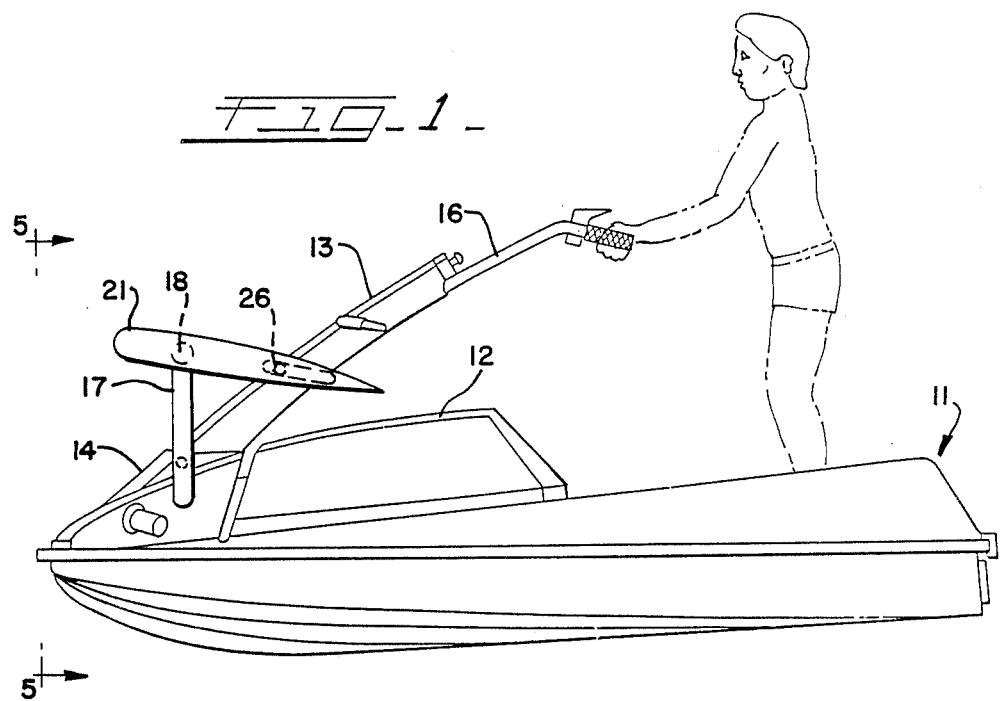
FIG. 1 is a side view of a small watercraft according to the first embodiment, with an operator riding on it.
Figure 2:
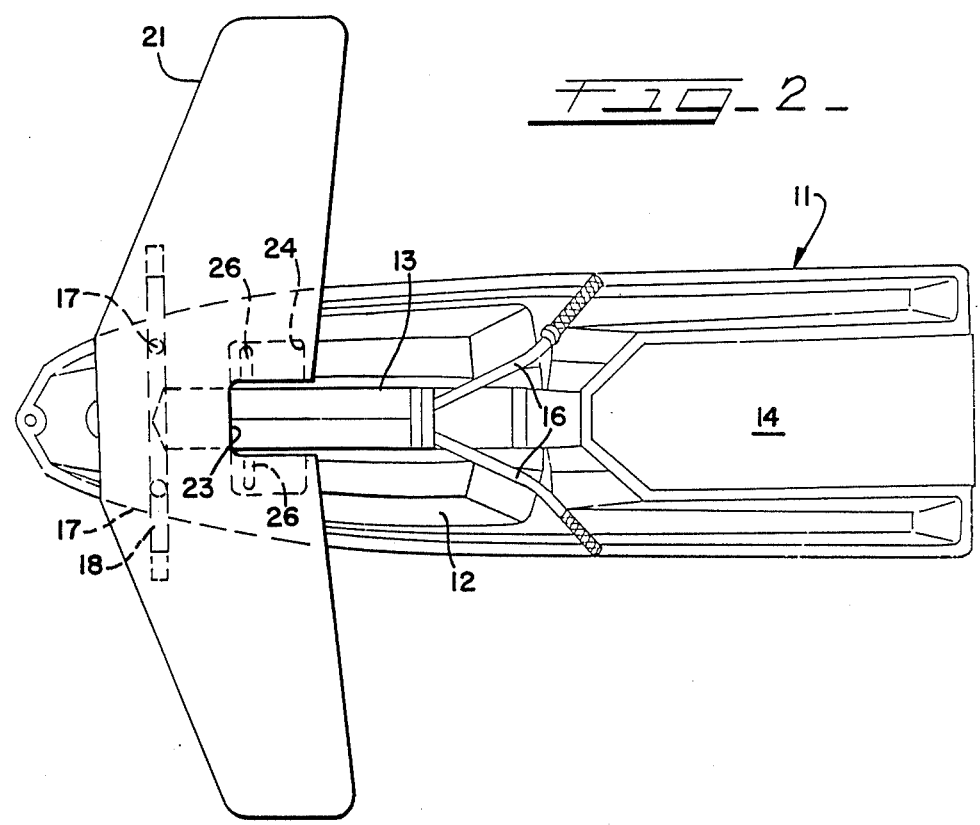
FIG. 2 is a top plan view of the craft of FIG. 1.

With reference to FIGS. 1, 2, 5 and 6, the craft includes a hull 11 made, for example, of synthetic resin, which includes an engine hood 12 adjacent the bow. A control handle 13 is mounted at its forward end on a bracket 14 attached to the hull 11 at the bow, and the handle 13 is pivotable in a substantially vertical plane that includes the keel line. The handle 13 extends over the hood 12 toward a platform 14 where an operator stands and holds a pair of laterally pivotable bar handles 16 which are coupled to the rearward end of the handle 13. The engine hood 12 and the handle 13 are formed to be buoyant.

Secured to the hull 11 and extending upwardly at the bow are a pair of laterally spaced struts 17 which are located on opposite sides of the handle 13. The struts 17 support a laterally extending cross shaft 18, which is rotatably mounted on the top ends of the struts 17.

A wing 21 (made of a lightweight material such as foamed styrol) has the cross section of an airfoil. As best shown in FIGS. 3 and 4, the wing 21 has a lateral groove 22 formed in its underside adjacent its forward edge, and the wing 21 is mounted with the cross shaft 18 in the groove 22. The wing 21 is secured to the cross shaft 18 by straps 20 so as to support the wing 21 for pivotal or rotatable movement on the cross shaft 22. The wing 21 extends laterally substantially beyond the hull 11.

As shown in FIG. 1, the height of the wing 21 above the hull 11 is about one-half the maximum height of the control handle 13. The wing 21 has a rectangular recess 23 formed in its rear edge, through which the handle 13 freely extends. The wing 21 also has a pair of slots 24 formed in the side edges of the recess 23, and the slots open in and extend along both side edges of the recess 23. The handle 13 has a pair of laterally extending pins 26 which extend outwardly from both of its side walls at substantially its middle, and the pins are in slidable engagement with the slots 24.

Thus, the hull 11, the struts 17, the handle 13 including the pins 26, and the wing 21 including the slots 24, form a slider crank mechanism, which causes the wing 21 to change its angle of attack as the handle 13 is pivoted. When the handle is moved upwardly (FIG. 1) the wing is nearly horizontal, and when the handle is moved downwardly (FIG. 6) the wing slants sharply downwardly and rearwardly. In consideration of a balance between dynamic lift and drag, the wing 21 should have an angle of attack of about 1–5 degrees from the horizontal when the handle 13 is in the highest position (the operator's standing position) as shown in FIG. 1.

When the craft moves forwardly, a dynamic lift is produced by the wing 21 to raise the craft. In response to the swing of the handle up and down, the wing 21 varies its angle of attack to change the amount of lift. FIG. 1 shows the raised position of the handle 13 and FIG. 6 shows the lowered position of the handle. This increases the maneuverability and enables the operator to enjoy the thrill of flight or the like, when he turns the craft quickly or moves at a high speed.

In FIGS. 7 and 8, the hull 31 of a generally similar craft has a bracket 32 at the bow, which supports a control handle 33 which pivots up and down on a cross pin 34. The handle 33 extends upwardly and rearwardly similarly to that shown in FIG. 1.

The handle 33 has a pair of symmetrical wings 36 secured to its side walls. Each wing preferably has a lateral length of about ¼ of the maximum width of the hull, and the wings have an angle of attack of about 1–5 degrees to the horizontal when the handle is in the maximum raised position shown in FIG. 7.

The wings 36 are preferably formed of a lightweight material such as synthetic resin or the like to make the handle 33 lightweight and to increase the flotation and the ability of the craft to right itself after being overturned. Before operating the craft, the angles of attack of the wings 36 may be adjusted by pivoting the wings on brackets or hinges 37 which fasten the wings to the handle.

When the boat moves forward, a lift is produced on the handle, thereby enabling the handle to be operated with a smaller force by the operator. The angle of attack is, of course, varied as the handle is pivoted up or down by the operator.

In FIGS. 9, 10 and 11, a handle 41 similar to that previously described has an annular ratchet holder 42 secured to each of its vertical side walls 43, the holders 42 having teeth 44 facing outwardly. The side walls have holes 46 formed through them concentrically with the holders. On each side of the handle 41, a wing 47 has a ratchet wheel 48 secured to its laterally inner end, each wheel 48 having teeth 49 for engagemenmt with the teeth 44. Each wheel has a bottom disc 51, from which a sleeve 52 extends coaxially within the teeth 49 and loosely through the holes 46 in the handle 41. A tension spring 53 extends through the sleeves 52 and its ends are fixed to the discs 51 so as to urge the ratchet wheels 48 toward the sides of the handle.

As a result, the ratchet wheels 48 normally engage the holders 42 so that the wings cannot rotate clockwise (as seen in FIG. 10) due to air pressure during operation. However, the angle of attack of each wing 47 can be changed, together or separately, by first manually moving the wing outwardly from the handle 41 to disengage the ratchet teeth 49 from the holder teeth 44, against the force of the spring 53, then rotating the wing to the desired position, and releasing it to reengage the teeth.

The sleeves 52 could be constructed with splines and be interconnected by a boss having grooves, so that the wings may be rotated in synchronism.

In FIGS. 12 and 13, a handle 56 carries a one-piece wing 57 secured to the top end of a bracket 58. The bracket 58 is secured to and extends upwardly from the handle, and the wing changes its angle of attack when the handle is swung up or down.

Modifications within the scope of this invention may be made. For example, the wings could be designed to be foldable, and be divided into front and rear wing sections.

What is claimed is:

1. A small watercraft comprising a hull having a bow and a center line, a handle pivotably supported on said hull adjacent said bow and movable in a substantially vertical plane which includes said center line, said handle extending rearwardly over said hull and adapted to be manually pivoted, at least one wing attached to said handle and having an angle of attack which changes as said handle is pivoted, strut means fixed to said hull adjacent said bow, pivot means connecting said wing to said strut means for pivotably supporting said wing to change said angle, and slide means movably interconnecting said handle and said wing whereby, as said handle pivots, said wing pivots on said strut means.

2. A craft as set forth in claim 1, wherein said slide means comprises a lateral pin fixed to said handle, said wing having a recess formed therein through which said pole extends, and said wing having a groove formed therein which slidably receives said pin.

3. A small watercraft comprising a hull having a bow and a center line, a handle pivotably supported on said hull adjacent said bow and movable in a substantially vertical plane which includes said center line, said handle extending rearwardly over said hull and adapted to be manually pivoted, at least one wing attached to said handle and having an angle of attack which changes as said handle is pivoted, means for rotatably supporting said wing on said handle on a lateral axis, said means including a ratchet mounted on said wing concentrically with said axis, a ratchet holder mounted on said handle and meshing with said ratchet, and means for spring-urging said wing toward said handle so that said ratchet meshes with said holder, thereby normally preventing said wing from rotating relative to said handle.

4. A craft as set forth in any one of claims 1, 2 or 3, wherein said wing is formed of foamed styrol.

5. A small watercraft comprising a hull having a bow and a center line, a handle pivotably supported on said hull adjacent said bow and movable in a substantially vertical plane which includes said center line, said handle extending rearwardly over said hull and adapted to be manually pivoted, first and second wings extending laterally from said handle, and first and second mounting means respectively connecting said first and second wings to said handle for pivotal movement of said wings with respect to said handle, said wings further having an angle of attack which changes as said handle is pivoted, said first and second mounting means being operative to independently pivot said first and second wings.

* * * * *